United States Patent [19]

Grafe et al.

[11] Patent Number: 5,226,131
[45] Date of Patent: Jul. 6, 1993

[54] SEQUENCING AND FAN-OUT MECHANISM FOR CAUSING A SET OF AT LEAST TWO SEQUENTIAL INSTRUCTIONS TO BE PERFORMED IN A DATAFLOW PROCESSING COMPUTER

[75] Inventors: Victor G. Grafe, Corrales; James E. Hoch, Albuquerque, both of N. Mex.

[73] Assignee: The United States of America as represented by the United States Department of Energy, Washington, D.C.

[21] Appl. No.: 751,002

[22] Filed: Aug. 28, 1991

Related U.S. Application Data

[63] Continuation of Ser. No. 457,462, Dec. 27, 1989, abandoned.

[51] Int. Cl.$^5$ .............................................. G06F 9/40
[52] U.S. Cl. .......................... 395/375; 364/232.22; 364/262.4; 364/262.9; 364/251; 364/DIG. 1
[58] Field of Search ................................ 395/375, 775

[56] References Cited

U.S. PATENT DOCUMENTS

| 4,025,771 | 5/1977 | Lynch, Jr. et al. | 364/736 |
| 4,075,688 | 2/1978 | Lynch, Jr. et al. | 395/800 |
| 4,270,181 | 5/1981 | Tanakura et al. | 364/736 |
| 4,566,063 | 1/1986 | Zolnowsky et al. | 395/375 |
| 4,594,655 | 6/1986 | Hao et al. | 395/775 |
| 4,792,892 | 12/1988 | Mary et al. | 395/375 |
| 4,794,518 | 12/1988 | Mizushima | 395/375 |
| 4,858,105 | 8/1989 | Kuriyama et al. | 395/325 |
| 4,926,323 | 5/1990 | Baror et al. | 395/375 |
| 4,943,916 | 7/1990 | Asano et al. | 395/775 |

Primary Examiner—Thomas C. Lee
Assistant Examiner—Krisna Lim
Attorney, Agent, or Firm—Karla Ojanen; James H. Chafin; William R. Moser

[57] ABSTRACT

A sequencing and data fanout mechanism is provided for a dataflow processor is activated by an input token which causes a sequence of operations to occur by initiating a first instruction to act on data contained within the token and then executing a sequential thread of instructions identified by either a repeat count and an offset within the token, or by an offset within each preceding instruction.

18 Claims, 9 Drawing Sheets

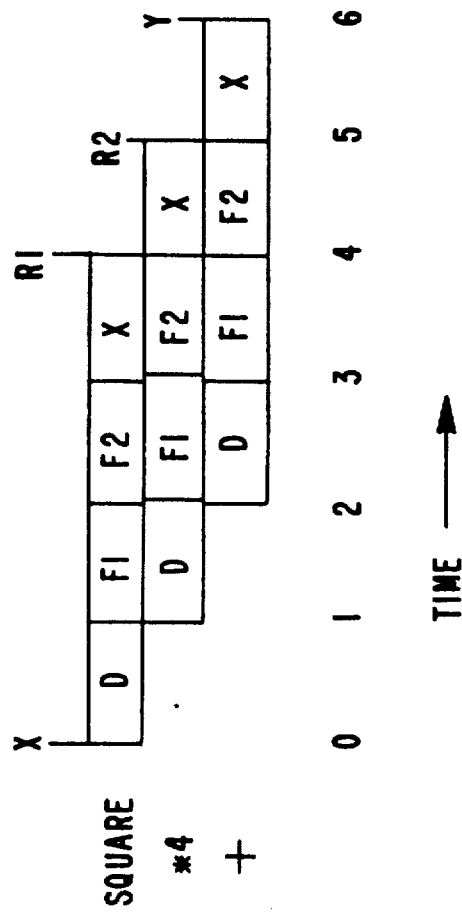
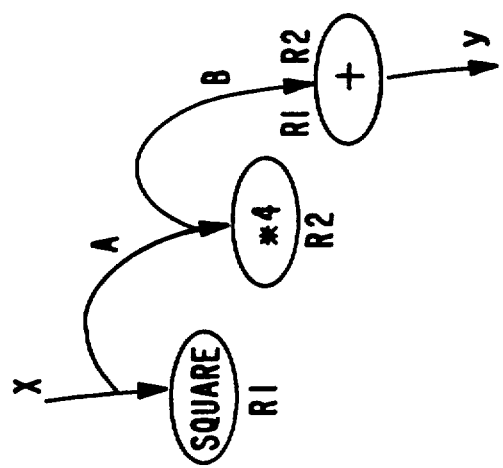
FIG. 8
R1, R2 - TEMPORARY STORAGE

SEQUENCING AND FAN-OUT MECHANISM FOR CAUSING A SET OF AT LEAST TWO SEQUENTIAL INSTRUCTIONS TO BE PERFORMED IN A DATAFLOW PROCESSING COMPUTER

The United States Government has rights in this invention pursuant to Contract No. DE-AC04-76DP00789 awarded by the U.S. Department of Energy to American Telephone and Telegraph Company.

This application is a continuation of U.S. patent application Ser. No. 457,462, filed Dec. 27, 1989, now abandoned.

BACKGROUND OF THE INVENTION

The invention relates generally to field of parallel computer architectures and more particularly to a sequencing and fan-out mechanism for use in dataflow machines. Dataflow machines are those machines whose actions are determined by the availability of the data needed for those actions. The invention enables greater availability of data when it is needed, and greater flexibility and efficiency for the actions that can be accomplished.

Recently, parallel computing has achieved two advances: first, that it is possible to efficiently execute programs as dataflow graphs thereby dynamically exploiting the maximum amount of parallelism; and second, that, if feasible, static direction of parallel execution can be very efficient. The ability to dynamically exploit parallelism is required to execute a general class of problems in parallel, but the cost of synchronization and context switching determines the granularity of the parallelism that can be efficiently exploited. Therefore, it is important to minimize these costs. As the costs are minimized, more parallelism is exposed for masking latency, filling pipelines, and keeping multiple processors busy. Ideally, the system should statically schedule finer grains to pay the synchronization cost for only the amount of parallelism required.

A high performance computer architecture may exploit parallelism in several ways. Traditionally, uniprocessors use parallelism to allow pipelined execution. Multiprocessors use parallelism to keep multiple processors busy. In general, however, a processor must use parallelism to mask long unpredictable memory latencies, or suffer a performance degradation. If a processor is unable to mask unpredictable latencies with useful work, it simply idles.

Parallelism may be exploited under explicit direction from the programmer, or preferably, it may be exploited as necessary by the architecture. For any program, parallelism is most abundant at the operation level. Partitioning a problem into larger grains will mask inherent parallelism. This technique may be necessary if the target architecture cannot efficiently switch between parallel activities, and may be desired if there is still sufficient parallelism at this larger grain size. But if the synchronization between parallel activities is not efficient, the use of fine grain parallelism will not be practical.

The architecture of U.S. patent application, Ser. No. 223,133, abandoned, now U.S. continuation application Ser. No. 07/559,523, filed Jul. 24, 1990, entitled "Data Flow Machine for Data Driven Computing," by Davidson et al., has demonstrated that very low cost synchronization and context switches at the instruction level are feasible. However, that architecture does not take advantage of static scheduling to further reduce the parallel overhead and, therefore, the execution time. Other architectures take advantage of static scheduling for more efficient execution, but these prior art architectures have poor support for run-time, dynamic parallelism.

New parallel computing architectures do not encompass the traditional von Neumann architecture because of the performance demands for processing large scientific codes. The new architectures require mapping, that is, that the problem be explicitly partitioned among parallel processors. Mapping can be a difficult and time consuming task.

The problem of data fanout within a processor is unique to dataflow machines. A conventional control flow machine accesses data by reading from a particular memory location, as in U.S. Pat. No. 4,858,105, entitled "Pipelined Data Processor Capable of Decoding and Executing Plural Instructions in Parallel," to Kuriyama et al. Kuriyama et al., however, as with all control flow machines, cannot schedule instruction on the availability of data and, consequently, exploit fine grain parallelism. A control flow machine can access any data item any number of times for any purpose by reading the data item from memory or from some internal register. A dataflow processor can emulate this method of operation by reading the data item for each use, but this method adds unnecessary overhead to the computation and slows the processing considerably. So, to reduce the overhead, a dataflow processor writes data items to instructions that require them. Usually, in a dataflow processor, a data item and an address are transmitted together as a token to a processor. The system works well as long as there are just a few uses of each data item, but slows down when a data item is needed by many instructions. U.S. Pat. No. 4,943,916, entitled "Information Processing Apparatus for a Data Flow Computer," to Asano et al. teaches tagging data for use with other data of the same tag to be operated upon by the same instruction; however, Asano et al. do not even suggest that sequential scheduling of instructions is possible.

There have been several previous approaches to distributing the data to the processors executing the instructions, or data fanout. One approach duplicates the overhead of a control flow processor, surrendering many of the benefits of dataflow processing. A second approach allows a large number of destinations for each computation, a system which uses more complicated hardware to speed the process when fanout is required, but which slows the process when fanout is not required. A third approach uses trees of instructions to generate copies of the data items, allowing the highest speed processors to be built, but requiring the data to be duplicated for fanout at a considerable cost of execution time.

Hence, it is a purpose of this invention to provide for an improved data fanout mechanism in a dataflow machine. This object is achieved by preprogrammed repeated copying of the data so that the fanout occurs in a known order and with known timing so that the data is available when needed. Moreover, the data fanout mechanism of the invention reduces the latencies caused by previous methods of data fanout because it does not require use of the processor's execution resources.

An additional advantage of this data fanout mechanism is reduced network bandwidth requirements because the responsibility for making copies of a data item is placed on the processing node which is the user of the copies, rather than the data producer. In addition, producers of data can be connected to multiple users at different times which allows greater usability of code.

It is another object of this invention to provide information in the incoming data token to cause the processor to repeat the data as necessary. This object is achieved because the data is repeated to the instructions according to offsets and repeat counts in the token format.

It is another object of the invention to attain efficient sequential execution of instructions in a dataflow machine. Prior to this invention, in a pure dataflow machine, the processor didn't have the capability of realizing which data and which instruction was immediately preceding or immediately following the data being processed by the current instruction. But with the present invention, because of the invention's capability to know which data values are accessible and the order in which instructions are to be executed, one data item or one instruction can be transferred to high speed registers and then back into the ALU for use in the next instruction, as opposed to generating a resultant data token and placing that token into queue and back through the pipeline for execution by another instruction.

It is yet another object of the invention to allow dataflow scheduling of fully ordered sequences of instructions scheduled as a unit by, for instance, including a register file to store temporary results computed within an ordered instruction sequence. This object is achieved by ordering a series of instructions requiring repeated use of a token, and the ability of the invention to store and access temporary results, e.g., in a high speed register.

It is yet another object of the invention to increase the ability of dataflow machines to exploit the teachings of von Neumann and control flow computing in terms of hardware, configuration, compiling techniques, and the availability of algorithms. This object is achieved by scheduling ordered sequences of instructions and sharing data within these sequences.

It is another object of the invention to have high speed dataflow processing with excellent uniprocessor performance. This object is achieved through the use of data fanout, the repeated use of the data, and sequential scheduling of instructions.

It is also an object of this invention to provide a processor input responsive to the token for selecting a sequence of operations to be performed by the processor.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise, in a dataflow architecture wherein processing instructions are stored in memory, a processing means responsive to a token, wherein the token identifies and causes a set of processing instructions to be executed in a predetermined order. The token comprises an address in a memory location associated with an operation to be performed on data within the token; the token also having an offset representing a displacement of memory locations from the memory location associated with the previous operation, and the token also having a repeat count, wherein the processing cycle on the token comprises executing a first operation on the token's data, decrementing the repeat count, and identifying the subsequent operation to use the data by moving through the memory locations the amount of the offset, and then performing that operation associated with memory location, decrementing the repeat count, and repeating the above steps until the repeat count is nil.

An alternative sequencing and fanout mechanism is provided by the dataflow computer processor and method of dataflow computer processing wherein the means for identifying the location of the immediate successor operation of the sequence of operations is in the current instruction and further comprises the memory location of the successor operation.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 8 illustrates the number of cycles required to execute the same problem on the dataflow processor using the data fanout and sequencing mechanism of the invention.

DETAILED DESCRIPTION OF THE INVENTION

Figure 1:
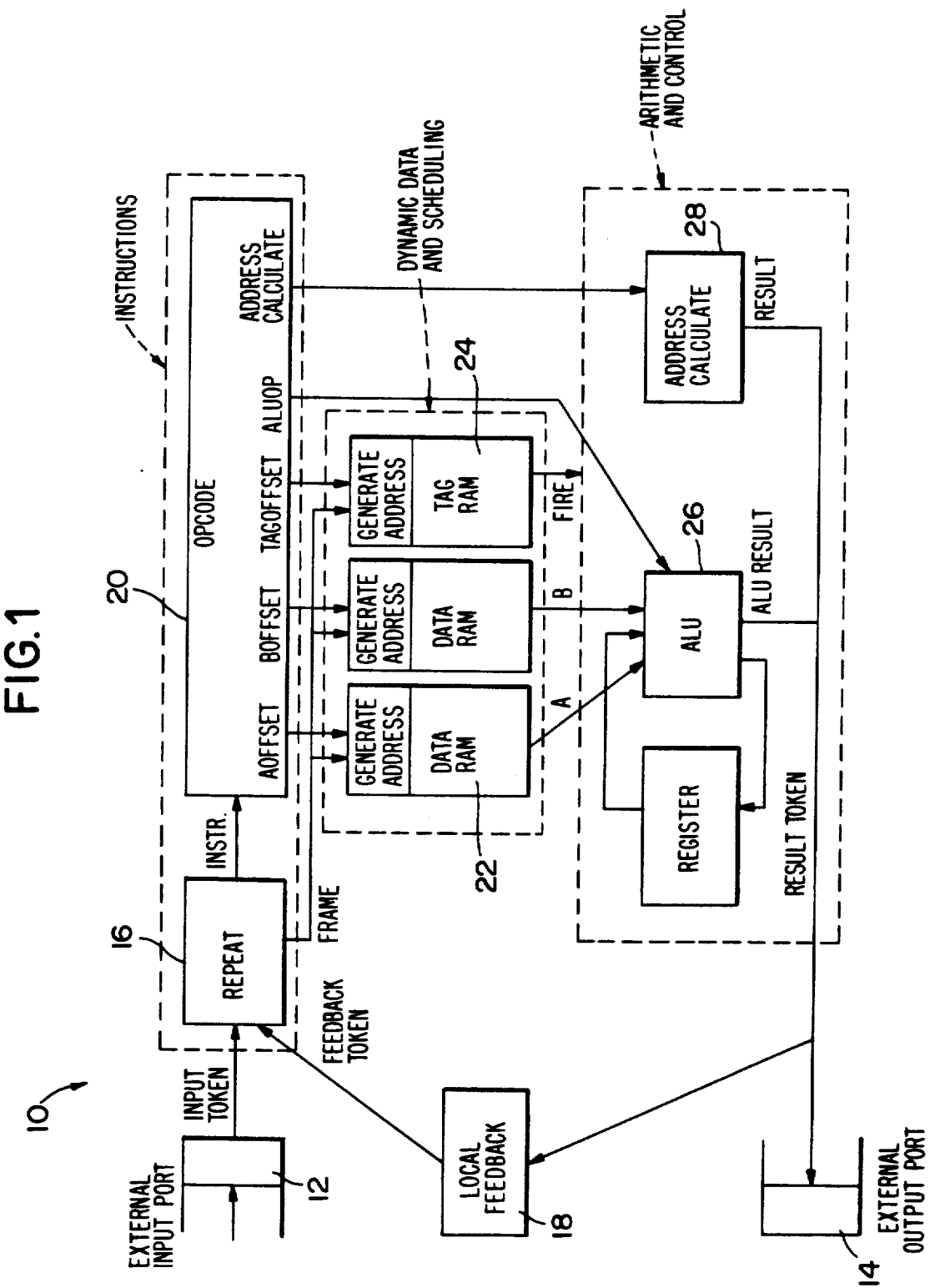
FIG. 1 is a block diagram of the dataflow processor which implements the data fanout and sequencing mechanism of the invention.

Although this invention is particularly disclosed in conjunction with the Eps'88, also known as the Epsilon2 or the Epsilon 1B, processor architecture reported in Sandia National Laboratories Report SAND88-3128, "EPS'88: COMBINING THE BEST FEATURES OF VON NEUMANN AND DATAFLOW COMPUTING", January, 1989, by V. Grafe, J. Hoch, and G. Davidson, which report is incorporated herein by reference, the principles of this invention may easily be transferred to other processors, such as the processor of U.S. patent application Ser. No. 223,133, filed Jul. 22, 1988, abandoned, now U.S. Continuation application Ser. No. 559,523, filed Jul. 24, 1990, entitled *Data Flow Machine for Data Driven Computing*, by Davidson et al., the application of which is also incorporated herein by reference.

For purposes of discussing the function of the processors herein: an algorithm is exprresed as a program, and a program is divided into tasks. A task is a dataflow graph in which each node will be called a grain. A grain is a fully ordered sequence of one or more instructions. A task usually corresponds to a function invocation, a loop iteration, or a set of loop iterations, although straight-line code could also be divided into several tasks. A program is generally partitioned across processors on task boundaries.

The dataflow computer know as Epsilon 1 disclosed in U.S. patent continuation application Ser. No. 559,523, filed Jul. 24, 1990, entitled *Data Flow Machine for Data Driven Computing*, by Davidson et al., has a plurality of processor nodes where each node has a plurality of FIFO registers, a plurality of dataflow memories, and an arithmetic processor. One register receives input information and provides it to the dataflow memories, a second register provides output to a recipient, and a third register provides information from the processor back to the memories. The dataflow memories include four commonly addressed memories: (1) a parameter memory to hold parameters used in calculations; (2) an opcode memory to hold an instruction; (3) a target memory to hold the output address; and (4) a tag memory to hold status bits for each parameter. The basic operation of this dataflow computer is as follows: at compile, the opcode memory is loaded with various instructions at various memory locations. For example, an address could hold the opcode to multiply two parameters. When an input signal arrives with data to be multiplied, it will be placed in one of the parameters associated with the address and a tag bit is set accordingly. When another input arrives with the other data value to be multiplied, it is placed in the second parameter associated with the address and another tag bit is set. Independently of anything else happening in the computer, the processor node detemines that the two tag bits for the address are set, and multiplies the numbers in the two parameters.

A second architecture, embodied in Epsilon 1B, and Epsilon2 or Eps'88, retains the high speed direct match dataflow scheduling mechanism of the aforementioned processor and its ability to exploit operation level parallelism. Unlike the earlier processor, however, the new architecture allows dynamic allocation of procedure activation records which, for example, permit recursion. In addition, the Epsilon2 architecture allows dataflow scheduling of fully ordered sequences of instructions as a scheduled unit. It includes a register file to store temporary results computed within an ordered instruction sequence, and allows data to be shared between instructions through common memory locations. Thus, a single processor can execute as efficiently as any traditional single processor.

The architecture of the processor described herein combines operating characteristics of dataflow and von Neumann computing models. The dataflow foundation of the architecture allows multiple processors to execute efficiently in parallel, while the ability to follow static direction allows the code direct control over the efficiency of execution. The description of the processor that follows focuses on the operation, and will begin by explaining the dataflow foundation, significantly enhanced by the use of frames. This will be used to show how indivisible groups of operations can be implemented.

With reference to FIG. 1, each processor node 10 includes an input FIFO-buffered port 12 and an output FIFO-buffered port 14. The repeat section 16 selects between the input port 12 and the feedback port 18, but more importantly, the repeat section 16 also fans out data and signals and is capable of triggering any length sequence of operations in a predetermined order. The opcode memories 20 contain the instructions. The offsets from the instruction memories are added to the incoming information to generate the addresses into the data and tag RAMs or registers, 22 and 24, respectively. An arithmetic logic unit 26 receives data and values from registers 22 and 24, and performs the operation directed by the opcode. The address calculation sections 28 generates the pointer to the instructions that require the result of the opcode operation. The result of the arithmetic operation is joined with the result of the address calculation and is written to either or both the output port 14 and feedback port 18 if the tags indicated that the instruction fired.

Figure 2:
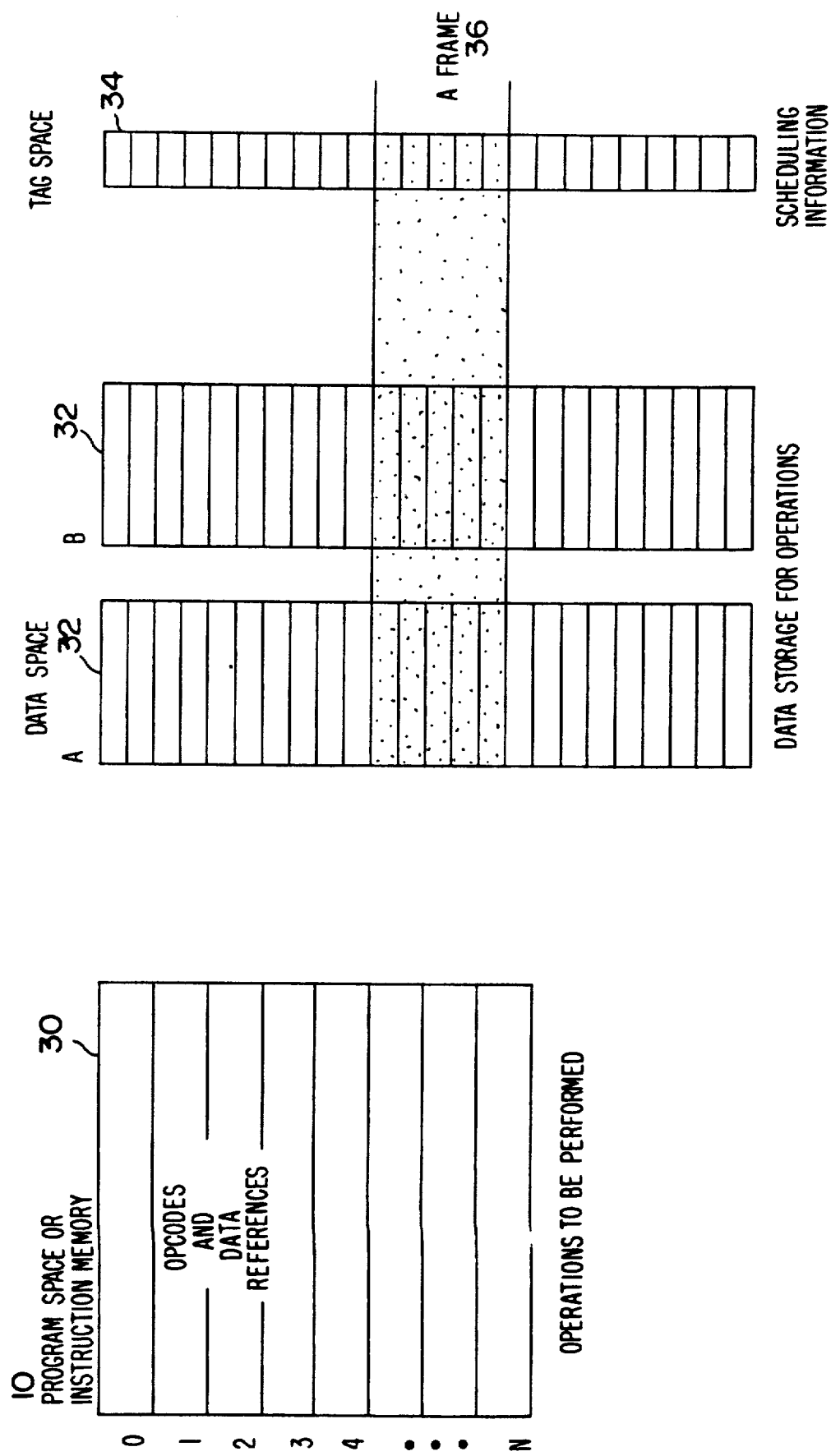
FIG. 2 illustrates the memory space division of the dataflow processor which implements the data fanout and sequencing mechanism of the invention.

Referring now to FIG. 2, the processor node 10 has three logical memory spaces: program space 30, also referred to as the instruction memory, data space 32, and tag space 34. The separation of the memory spaces allows the computer to take beneficial characteristics from both dataflow and von Neumann computing. The program space 30 determines the operation to be performed and loosely corresponds to the notion of instructions in a conventional computer. The data space 32 provides storage for intermediate data. The tag space 34 determines the synchronization and scheduling of operations and has no real analogue in the von Neumann model. The closest von Neumann function would be a program counter which is a very restricted scheduling method when compared to the tag space of the dataflow machine.

Figure 3:
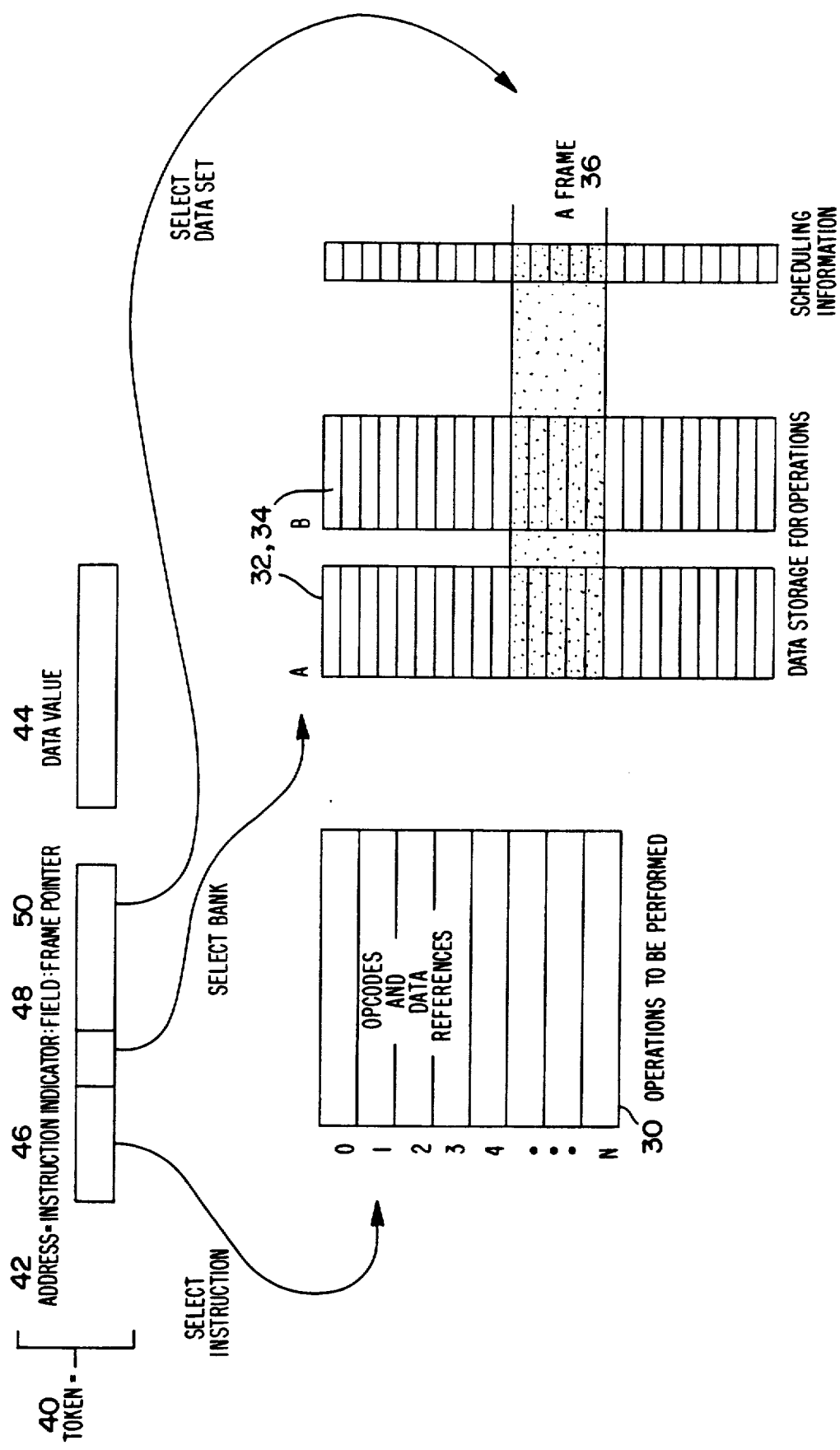
FIG. 3 illustrates a data token and how the data token accesses the memory spaces of the dataflow processor.

The basic unit of communication of the dataflow processor of the invention is the token 40, illustrated in FIG. 3. A token 40 is the signal communicated to the processor node 10 and comprises an address 42 which identifies a set of instructions and a data value 44. The address 42 may be further divided into an instruction pointer 46, a field 48, and frame pointer 50. The instruction pointer 46 is the address of a memory location in the program space 30 or instruction memory containing a particular instruction. The frame pointer 50 is used as the base address for the frame 36 of the appropriate data space 32 and tag spaces 34. A frame 36 is a subset of a linear vectors in memory, as illustrated in FIGS. 2 and 3. The instruction derived by instruction pointer 46 from program space 30 may contain the offsets associated with a particular frame. The field 48 may actually specify the operands of a binary operation to be accessed, for example, the first operand may be held in one data bank, while the second operand required for a binary operation may be held in a different data bank.

Referring back to FIG. 2, the program space 30 is kept separate from data space 32, allowing dynamic memory activity to be a natural part of the processor function. The scheduling decision made in tag space 34 is also separated not only from program space 30, but also from data space 32 allowing thread based operation. The data space 32 and the tag space 34 are physically a linear vector of memory locations in registers 22 and 24, but are accessed logically by offsets from a particular base address 42.

Another advantage achieved by configuring the data space 32 and the tag space 34 is that storage requirements are reduced, for example, when two instructions reference the same cell for the value of X, the required storage is reduced to the minimum. Reuse of storage is common in von Neumann computing but, prior to the invention herein, has been inconsistent with previous dataflow architectures.

A primary feature of the token 40 is that it contains information that indicates the next instruction to be executed, which has never been achieved in a dataflow machine prior to the invention. The feature in which the token achieves accessing the next instruction is the use of offsets in several ways. In addition, these offsets can be used to build arbitrary repeat chains allowing the repeated use of data, again never accomplished in a dataflow machine. The use of repeat chains provides for more efficient processing than the prior techniques of either recalculating the data or retrieving the value from memory. The information which teaches the repeated use of data can be in either the program space 30 accessible through offsets or on the current token accessible through the repeat count and steps.

Figure 4:
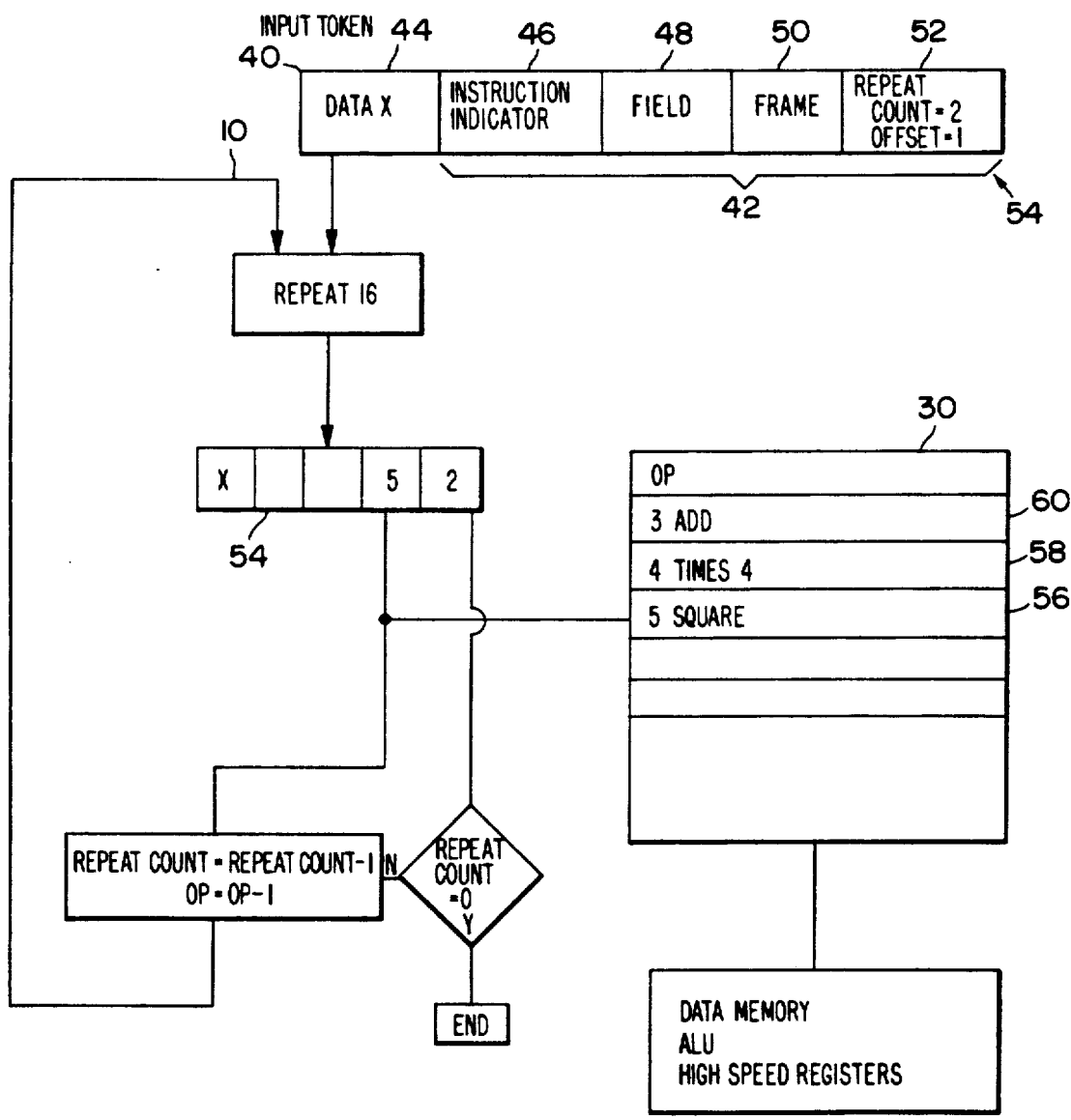
FIG. 4 illustrates one embodiment of the invention and how the data in the token is copied and used by a sequence of instructions.

FIG. 4 shows an embodiment where the repeat information is provided in the input token 40 by the repeat count 52 with an step or an offset 54. Although already mentioned, an offset 54 is herein defined as a displacement from an address, the address of which could be indicated by an instruction pointer 46 or a frame pointer 50 to another address. In this embodiment, the input token 40 includes a data value of X 44, and the address 42 includes an instruction pointer 46, field information 48, and a frame pointer 50. In addition, the input token 40 includes an offset 54 which indicates the number to be added to or subtracted from the initial address upon entry into the repeat section 16 of a node 10. The repeat count 52 indicates how many times the offset 54 will be added to or subtracted from the preceding address. In the illustration of FIG. 4, the repeat count 52 is two, and the offset 54 is one, although the offset 54 may be either any positive or negative integer. The input data 44 is directed by the instruction pointer 46 to an address of the instruction memory 30, which in this case is Address No. 5, SQUARE, 56 which will square the value of X. Because the repeat count 52 is greater than zero, the node will decrement the repeat count by one, and the address in the instruction memory 30 is incremented or decremented by the offset 54. In this illustration, the offset 54 is −1, so the same token 40 is directed to instruction memory Address No. 4, TIMES4, which will multiply the value of X by four. The repeat count 52 is decremented once more, and the data is directed to instruction memory Address No. 3, ADD, 60 and X is added. At this time the repeat count has been decremented twice, the repeat count is now 0; so there are no further repeats at this node, the use of the data in the token is complete in this node, and a new input token is accepted.

Figure 5:
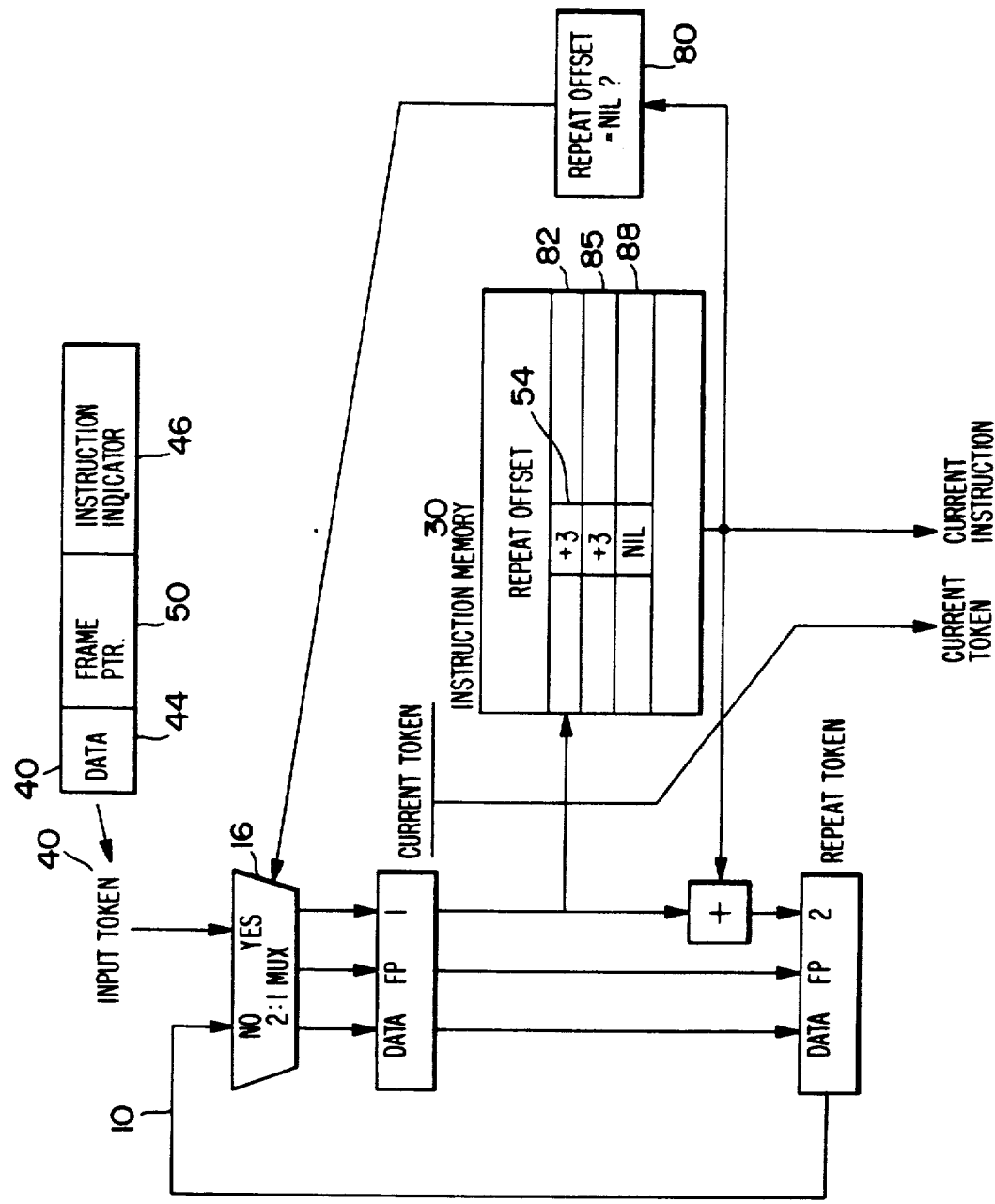
FIG. 5 illustrates a second embodiment of the invention wherein the copying of the data and the sequencing of the instructions are attained by information within the previous instruction.

The second basic method by which data can repeated to the next instruction in the dataflow machine is the use of offsets in the instruction itself, shown in FIG. 5. In this embodiment, the repeat offset in the instruction memory 30 serve as means responsive to the token 44 for selecting a sequence of consecutive operations to be performed by the processor. The input token 44 is directed by the repeat section 16 of the node 10 to an address 82 in instruction memory 30. The instruction in address 82 has an offset 54 of +3, so the data of token is directed to an addressed displaced three locations, i.e., to instruction address 85. Likewise, the data of the token 44 is now directed to an address further displaced by +3 to address 88. This repeated use of the data through offsets is continued until the instruction of the instruction memory has a repeat offset of nil, indicated by inquiry 80.

If in the above illustration of FIG. 5, the repeat offset for the input token is nil, the number of operations for the sequence is one; a case where the additional memory and hardware of this invention does not benefit the dataflow process. However, if the repeat offset is not nil, the processor of this invention provides significantly improved performance. This invention greatly reduces the time required to execute the computation because of the ability to fanout the data at a node, rather than at a remote location from the node.

Figure 6:
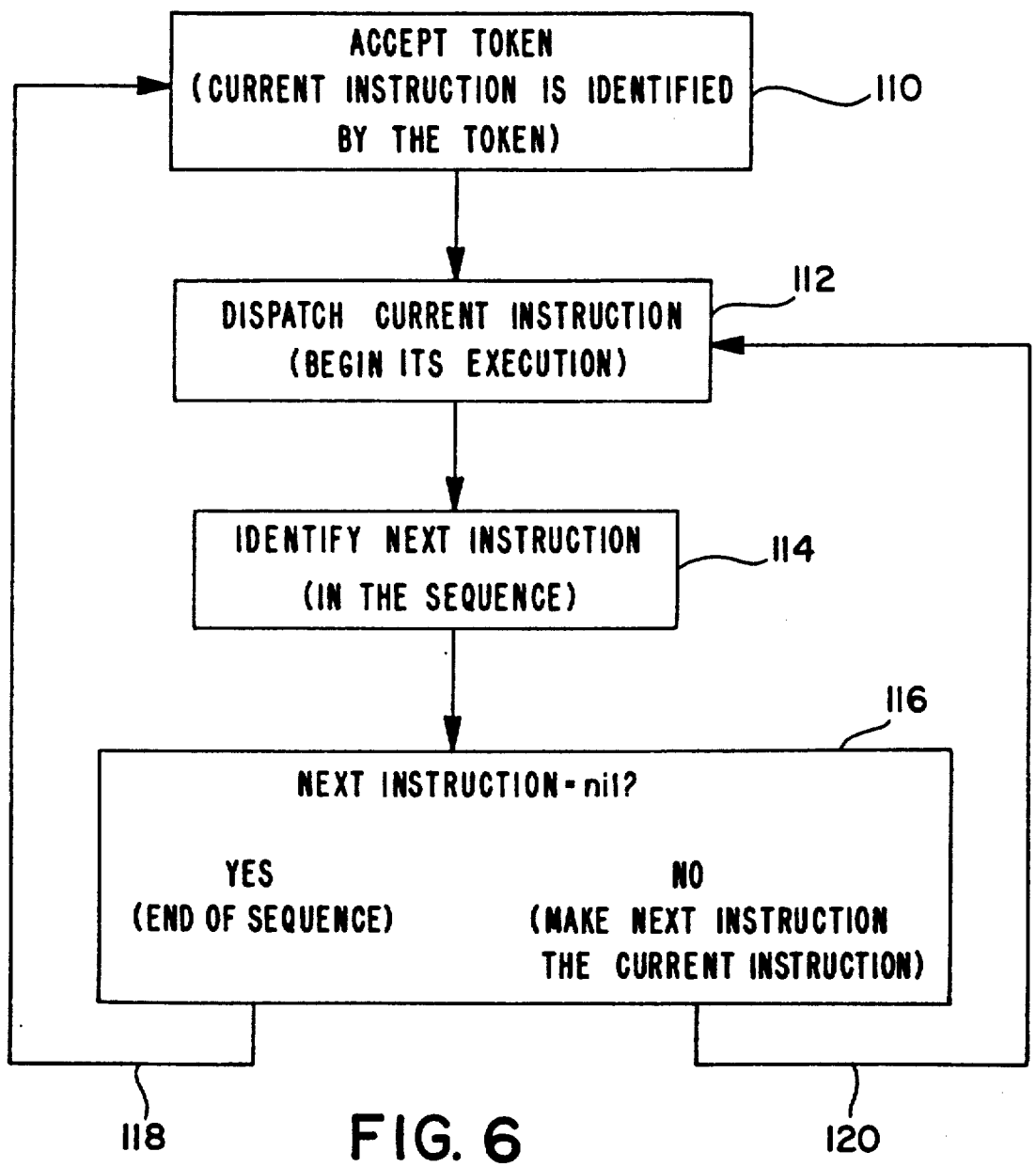
FIG. 6 is a generic flow chart of the dataflow and sequencing process of the invention.

The basic process of the invention generic to the embodiments of FIGS. 4 and 5 which utilize the data fanout and sequencing mechanism of the invention is illustrated in FIG. 6. Initially, the processor node accepts a token which contains information on how to access the current instruction 110. The current instruction is retrieved and execution of the operation onto the data in the token is initiated 112. The next instruction in the sequence is identified either by repeat count and offset information contained within the token or by offset or address location in the current instruction 114. When the repeat count in the token is decremented to nil, or when the subsequent instruction has a nil indicator for the next instruction 116, the sequence of instructions is completed and a new token arrives to the processor node 118. If, however, the repeat count is not nil or the current instruction does indicate that a new instruction is to follow 120, the next instruction is retrieved and the cycle begins anew.

Figure 7:
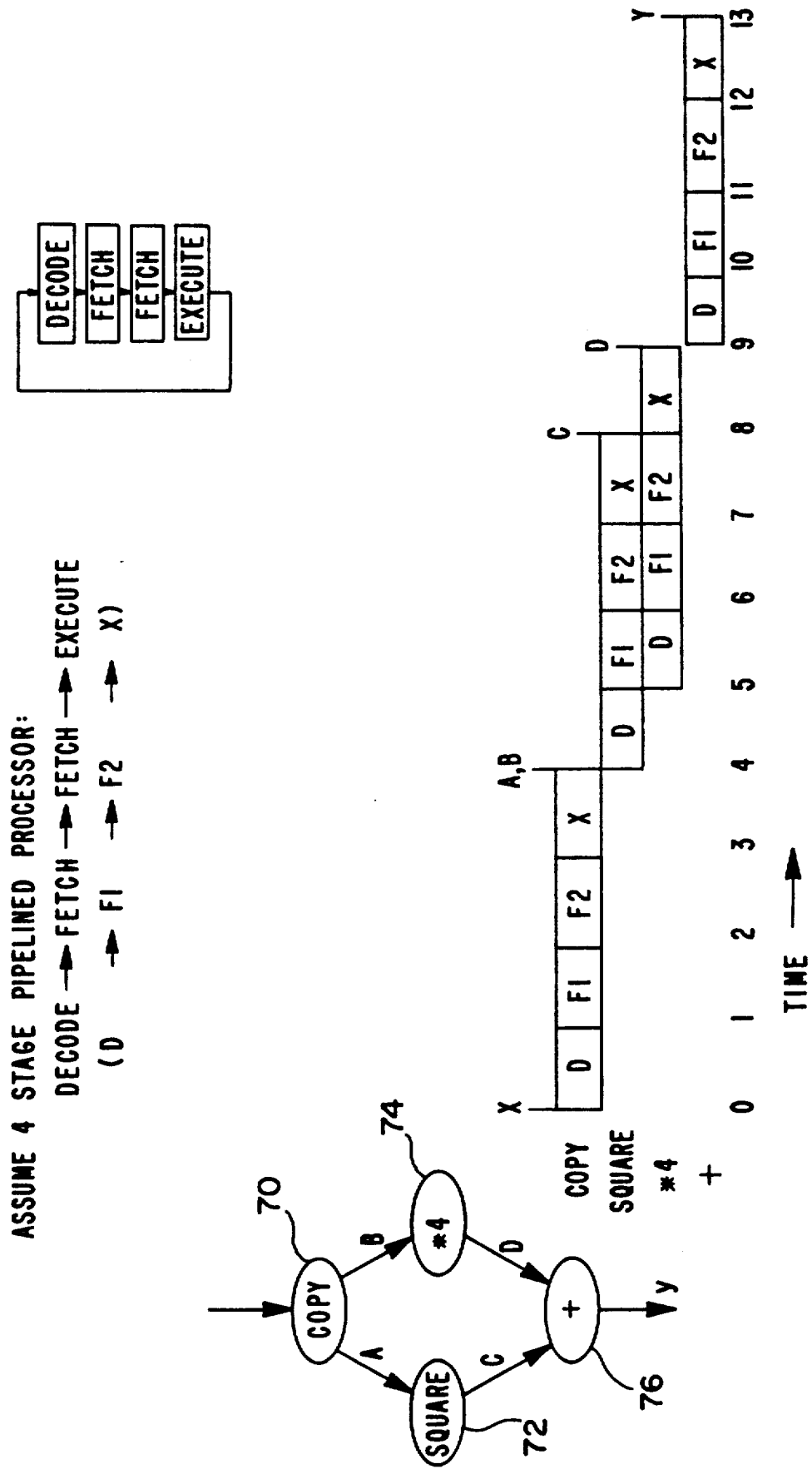
FIG. 7 illustrates the number of cycles to required to execute a simple problem on a prior art dataflow processor.

Comparing the solution of an algebra problem on a prior art processor, as shown in FIG. 7, with the solution implementing the techniques of the invention, as shown in FIG. 8 illustrates the improved processing efficiency achieved by the invention in a dataflow machine. Assuming a four stage pipelined processor implementation, the processor of the prior art in FIG. 7 shows an operation-level dataflow graph for the computation of $X^2+4X$. Each bubble in the graph represents one instruction of the compiled code which have been loaded into the instruction memory of the dataflow processor. At compile, one instruction pointer of a processor node is defined as the function SQUARE, another instruction pointer is defined as the function TIMES4, and a third instruction pointer is defined as ADD. These instruction pointers may be on one or several nodes. The computation shown begins when the value of x is computed by some other instruction in the program and arrives at this processor where it must first be copied into two tokens 70, one having the address of the SQUARE instruction pointer 72, and the other to the address of the TIMES4 instruction pointer 74. After the copies have been completed, the SQUARE may begin, followed by the TIMES4. After the SQUARE and TIMES4 have both completed, the final ADD 76 is executed. In a four stage pipelined processor implementation this execution would require thirteen clock cycles to execute.

Referring to the repeat feature of the invention, shown in FIG. 5, and just as above, assuming a four stage pipelined processor implementation, the instructions are compiled into program space or instruction memory 30 and the basic form of the instruction includes repeat offsets that indicate that another instruction requires the same data. Referring now to FIG. 8, the input token is written to the token's instruction pointer to the address, SQUARE, of the node on one cycle, which causes the data to be squared. A repeat offset stored at that address is added to the pointer in the token and the new value in the next instruction pointer points to an instruction pointer location in processor where, during the second cycle, the data value is operated on by the function TIMES4. The value of offset at this address is added to provide a new offset. This value points to an ADD instruction pointer in the processor. This instruction pointer has been directed by the program at compile to receive its data from the arithmetic logic unit in the processor node that has stored the values resulting from the functions SQUARE and TIMES4. During the third cycle, the ADD instruction pointer operates on the values from the arithmetic logic unit. This instruction pointer also has a repeat offset of NIL, a value which tells the system that the node has completed its repeat cycle. The output of the ADD instruction pointer is then transmitted to the system. The output occurs on a third clock cycle. Note, that there is no need for a copy operation, and the three arithmetic operations may now be overlapped in the execution pipeline. The time required to execute the computation has been reduced to six cycles, and the number of instructions required has been reduced by twenty five percent.

An example of hardware required to implement this embodiment could include an adder to increment or decrement the instruction pointer by the amount of the offset, and input means for feeding the repeat token back into the processing system in place of the input token that had arrived on the previous clock cycle. The adder could also include comparison means for ending the repeat process when a NIL offset is detected.

There are many other ways that the repeat function of this invention may be implemented. For example, instead of using offsets in the instruction memory, direct addresses for subsequent operations could be provided, with any predetermined address indicating the end of the repeat process.

In addition, the repeat tokens may be implemented on a memory controller; tokens may be read from the input port by the repeat controller to multiple memory cells instead of to instructions. This allows vectorized memory access to reduce the process/memory communications requirements. The repeat controller sends tokens to the memory controller, which directly controls the physical memory.

Figure 9:
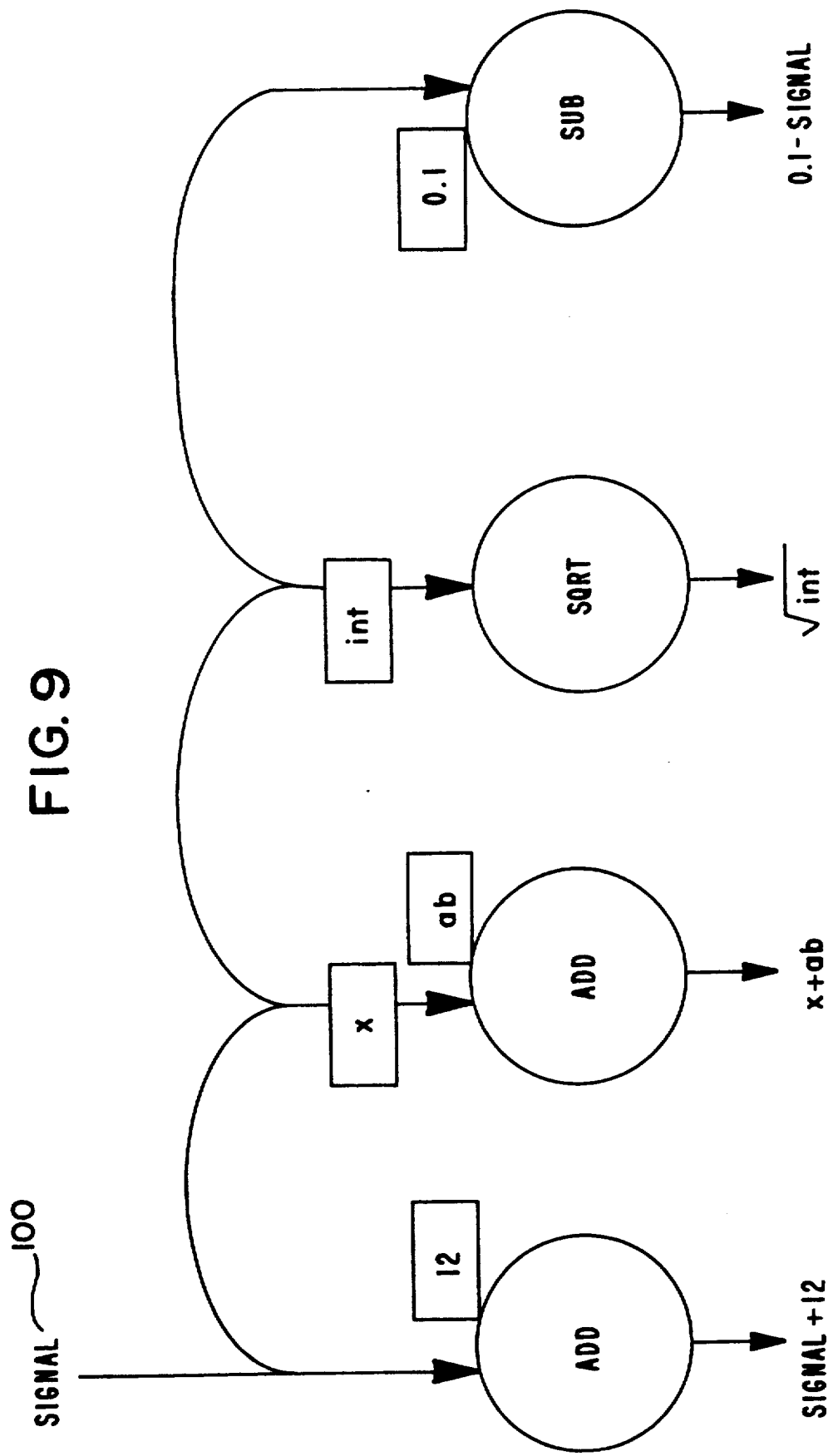
FIG. 9 illustrates the sequencing mechanism of the invention.

Threads of serial operations may be built using the repeat chains and the capability to reuse data, and reduce the latency of the computation. In an example shown in FIG. 9, four instructions are statically ready to execute. When the token SIGNAL 100 arrives, it is repeated to all four instructions by means of a repeat chain in the order prescribed by the repeat offsets. The four operations, thus, are executed in a serial fashion. In this instance not all of the instructions necessarily use the value of SIGNAL 100, but may reference other data values in the data space with the offsets embedded in each instruction. This separation of scheduling information from program and data space allows both operation level parallelism and efficient serial execution. The ability to execute threads of operations in a known strictly sequential order allows processor state to be used to advantage. In von Neumann, processor state is used to great advantage to reduce memory traffic and improve performance. The invention described herein provides a means to exploit the processor state to achieve the same benefits in a dataflow machine.

When there are multiple interleaved threads of execution on a single processor, the contents of the registers are not guaranteed to be preserved between separate grains. Thus the registers are strictly temporary storage for use within a grain and cannot be used to pass data between grains. In the special case of a processor executing a single, sequential program, register state can be managed just as in a von Neumann processor.

The repeat function of the invention enables exploitation of both Von Neumann and dataflow architectures. The ability to repeat information enables mutable data storage and pipelined sequential execution, as well as incorporating register files to minimize latency between the generation and use of data, just as in a von Neumann processor. In fact, a dataflow parallel processor capable of implementing this invention should be quite competitive with a von Neumann processor on a single sequential thread. Another result of merging von Neumann and dataflow concepts enables the processor to support both functional and imperative languages with pure dataflow and pure sequential execution.

Functional languages, translated to dataflow graphs, are natural candidates for parallel execution. When discussing functional languages we adhere to the concept of a general dataflow graph because other semantics of functional languages do not conflict with fine grain parallelism.

Imperative languages, such as FORTRAN and C, are also important because of their historical dominance and the efficiencies available from a mutable storage model. When discussing imperative languages, we often speak of interleaved or concurrent threads of execution. It is natural to think in terms of multiple threads when we start with an imperative language which is "serial until proven parallel." Because the Epsilon2 architecture allows dataflow scheduling of ordered sequences of instructions and allows data to be shared between these sequences, it provides a consistent model of what once was a polarized design space-dataflow or control flow.

While the Epsilon2 architecture does support pure dynamic dataflow, the von Neumann characteristics of the Epsilon2 architecture allow a number of graph optimization that have a significant impact on execution efficiency. In particular, the Epsilon2 repeat mechanism eliminates the overhead traditionally associated with data fanout in a dataflow processor. The use of shared memory locations allows data to be shared between ordered instructions without explicitly passing the data to each instruction which, in turn, allows arcs to be removed from the dataflow graph. Because a node in Epsilon2 dataflow graphs can be a sequence of instructions (rather than a single instruction), portions of pure dataflow graphs can be transformed into grains to optimize execution along a critical path. Intermediate results within that grain can be stored in the register file, removing more arcs from the graph.

It is intended that the scope of the invention be defined by the claims appended hereto.

What is claimed is:

1. An apparatus for causing a set of at least two sequential instructions to be performed in a dataflow processing computer, comprising:
   (a) an input means to accept an input token, said input token being a unit communication in said dataflow processing computer, said input token comprising a data value and an instruction identifier; (b) identifying means operatively connected to said input means to identify said set of sequential instructions from said instructions identifier, said set of sequential instructions to be executed upon the arrival of said input token;
   (b) identifying means operatively connected to said input means to identify said set of sequential instructions from said instruction identifier, said set of sequential instructions to be executed upon the arrival of said input token;
   (c) means to retrieve said set of sequential instructions in a predetermined order from a memory wherein each instruction of said set of sequential instructions is stored in a memory location of said memory, said retrieving means operatively connected to said identifying means;
   (d) means to transmit each instruction and all data required by each instruction of said set of sequential instructions in said predetermined order to an execution unit; and
   (e) means to determine that one of said instructions is a last instruction of said set of sequential instructions and to prepare said input means to receive a second input token.

2. The apparatus for causing a set of at least two sequential instructions to be performed in a dataflow processing computer, as in claim 1, wherein said identifying means identifies a memory location of an instruction of said set of sequential instructions and identifies a memory location of an immediate successor instruction within said set of sequential instructions.

3. The apparatus as in claim 2 wherein each of said memory locations further comprises an offset and said identifying means further reads said offset, wherein said offset represents the displacement from said memory location of said instruction of said set of instructions to said memory location of said successor instruction.

4. The apparatus as in claim 2 wherein each of said memory locations further comprises an address of said memory location of said immediate successor instruction and said identifying means for identifying a sequential set of instructions reads said memory location of said immediate successor instruction from said address and said retrieving means retrieves said immediate successor instruction.

5. The apparatus of claim 2, wherein said instruction identifier of said input token further comprises data to determine how many instructions are in said set of sequential instructions and data for identifying each instruction of said set, and data identify a particular instruction of said set; and said identifying means decodes said instruction identifier.

6. The apparatus of claim 5 wherein said data identify each instruction of said set of sequential instructions is an offset representing a displacement of memory locations from said particular instruction of said set, and said data for determining how many instruction are in said set is a repeat count, and said data to identify said particular instruction of said set is an address of said memory location comprising said particular instruction and wherein said particular instruction is transmitted to said execution unit, then said identifying means reads said offset to identify said successor instruction, and said repeat count is decremented, and another successor instruction in further identified by said offset until said repeat count reaches a terminal value, and in response thereto said determining means determines that one of said successor instructions is said last instruction of said set of sequential instruction.

7. A method for causing a set of at least two sequential instructions to be performed in dataflow computer processing in a dataflow machine, comprising the steps of:
   (a) inputting to a processor node of said dataflow machine a unit of communication called an input token comprising a data value and at least one instruction identifier which is an address of a memory location in a memory in said processor, and in response thereto
   (b) identifying said set of sequential instructions stored in said memory of said processor node, at least one instruction of said set of sequential instructions identified by said instruction identifier of said input token; and in response thereto
   (c) retrieving said set of sequential instructions in a predetermined order from said memory; and
   (d) transmitting said set of sequential instructions and all data required by each instruction of said set in said predetermined order to an execution unit of said processor node wherein said set of sequential instructions are executed.

8. The processing method of claim 7, wherein said input token further comprises a particular instruction identifier which is an address of a memory location within said memory of a particular instruction of said set of sequential instructions, and wherein said memory location further comprises means to identify a successor instruction of said set of sequential instructions.

9. The processing method of claim 8 wherein said means to identify a successor instruction of said set is an address of a memory location with said memory.

10. The processing method of claim 8 wherein said means to identify a successor instruction of said set within said memory comprises an offset which represents the displacement from a memory location of one instruction to a memory location of an immediate successor instruction.

11. The processing method of claim 7 wherein said input token further comprises a first instruction identifier which is an address of a memory location within said memory of a particular instruction of said set of sequential instructions, and a second instruction identifier and said step of identifying said set of sequential instructions identifies a particular instruction of said set of sequential instructions by reading said first instruction identifier and identifies each successor instruction of said set by reading said second instruction identifier which is an offset representing the displacement of memory locations within said memory of an instruction within said set to said successor instruction.

12. The processing method of claim 11 wherein said input token further comprises a third instruction identifier which is a repeat count and said step of identifying a set of sequential instructions identifies a successor instruction and decrements said repeat count and continues to identify a successor instruction and decrement said repeat count until said repeat count reaches a terminal value.

13. A method for causing a set of at least two sequential instructions to be performed in dataflow processing in a dataflow machine having at least one processor node, comprising the steps of:
- (a) inputting to said processor node an input token identifying said set of sequential instructions, said input token having a data value, an instruction identifier to identify the location in an addressable memory of said processor node of an instruction; a frame identifier to identify the location in said addressable memory of any stored intermediate values, synchronization information to control scheduling of said set of sequential instructions, a repeat count to indicate the number of instructions in said set of sequential instructions, and an offset to identify the displacement from said memory location of said instruction to a location in said addressable memory of a successor instruction of said set of sequential instructions;
- (b) retrieving an instruction of said set of sequential instructions from a memory location identified by said instruction identifier, and retrieving any intermediate values, and preexisting values, and other data required for said instruction;
- (c) transmitting said instruction and all data required by said instruction to an execution unit of said processor node if said synchronization information indicates to do so;
- (d) performing said operation on said data and generating and storing said intermediate values and generating an output token if said instruction and said synchronization information so indicates; and
- (e) decrementing said repeat count.

14. The method of claim 13, further comprising:
- (f) and if said repeat count reaches a terminal value, inputting a second input token to said processor node.

15. The method of claim 13, further comprising:
- (f) retrieving a successor instruction of said set of sequential instructions from a memory location identified by combining said offset with the memory location of the previous instruction, and retrieving all data required by said successor instruction;
- (g) transmitting said successor instruction and all data required by said successor instruction to an execution unit of said processor node if said synchronization information indicates so;
- (h) performing an operation indicated by said successor instruction on said data, and generating and storing intermediate values and generating an output token if said successor instruction and said synchronization information so indicates;
- (i) repeating steps (e) through (h) until said repeat count reaches a terminal value, 16. A method of repeating the use of data in a dataflow machine having at least one processor node, comprising:
- (a) inputting to said processor node an input token identifying a set of at least two sequential instructions, said input token having a data value, an instruction identifier to identify the location in an addressable memory of said processor node of an instruction; A frame identifier to identify a location in said addressable memory of any stored intermediate values, synchronization information to control scheduling of said set of instructions;
- (b) retrieving an instruction of said set of sequential instructions from a memory location identified by said input token, said instruction having an offset to identify the displacement from said memory location of said instruction to a location in said addressable memory of a successor instruction of said set of sequential instructions, any intermediate values, preexisting values, and other data required for said set of sequential instructions;
- (c) transmitting said instruction and all data required by said instruction to an execution unit of said processor node if said synchronization information indicates to do so; and
- (d) performing said operation on said data, and generating and storing said intermediate values and generating on output token if said instruction and said synchronization information so indicates.

17. The method of claim 14 further comprising:
- (e) and if said offset is a terminal value, inputting to said processor node a second input token.

18. The method of claim 16 further comprising:
- (e) retrieving a successor instruction of said set of sequential instructions from a memory location identified by combining said offset with the memory location of said instruction;
- (f) transmitting said successor instruction and all data required by said successor instruction to an execution unit of said processor node if said synchronization information indicates to do so;
- (g) performing an operation indicated by said successor instruction on said data, and generating and storing said intermediate values and generating an output token if said successor instruction and said synchronization information so indicates;
- (h) repeating steps (e) through (g) until said offset successor instruction reaches a terminal value.

* * * * *